W. D. STEVENSON.
COMPOSITE ARTICLE INCLUDING PHENOLS AND FORMALDEHYDE AND METHOD OF MAKING SAME.
APPLICATION FILED JUNE 18, 1919.

1,392,535.  Patented Oct. 4, 1921.

Inventor:
Wm. D. Stevenson
by W. G. Doolittle
Attorney.

UNITED STATES PATENT OFFICE.

WILLIAM D. STEVENSON, OF PITTSBURGH, PENNSYLVANIA.

COMPOSITE ARTICLE INCLUDING PHENOLS AND FORMALDEHYDE AND METHOD OF MAKING SAME.

1,392,535.   Specification of Letters Patent.   Patented Oct. 4, 1921.

Application filed June 18, 1919. Serial No. 305,095.

*To all whom it may concern:*

Be it known that I, WILLIAM D. STEVENSON, a citizen of the United States, residing at Pittsburgh, in the county of Allegheny and State of Pennsylvania, have invented certain new and useful Improvements in Composite Articles Including Phenols and Formaldehyde and Methods of Making the Same, of which the following is a specification.

This invention relates to a new and improved composite article of manufacture, and the method of making the same, and more particularly to a composite non-laminated article and the method of making the same including in its composition infusible and insoluble condensation products of phenols and formaldehyde, or their equivalents.

So far as I am aware, sheet, plate or tubular articles of the class to which my invention relates have heretofore included a laminated body or a body made up of a plurality of superposed layers of suitable material, as for example, paper or cloth, bound together by suitable binding agents. Such laminated articles are objectionable due to the splitting, opening or separation which occurs between the superimposed layers.

Various methods have been followed in the manufacture of articles or materials of this character, with a view of producing a material or an article possessing the highly essential quality of non-splitting or cracking while being operated on or while in use, but the methods heretofore followed have not produced such an article.

Among the objects of the present invention are, to provide a new and improved method for the manufacture of a sheet, plate or tubular article of the character above mentioned, and the production of an article possessing electrical insulating and heat resisting qualities, strength and durability, capable of withstanding the action of solvents, as for example, neutral solvents, water and oils, and of such a character that it may be machined and drilled and employed without splitting or cracking.

Figure 1:
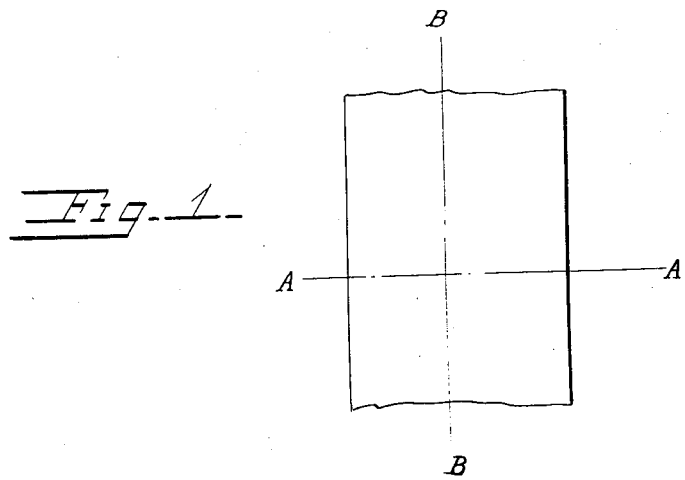
Figure 2:
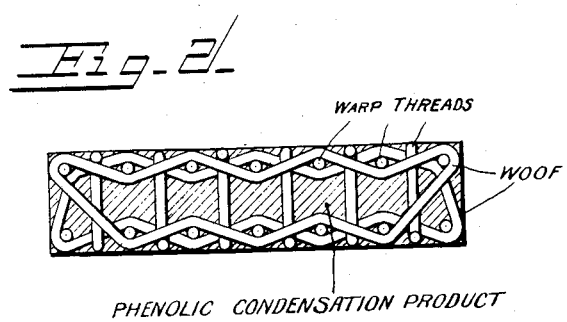
Figure 3:
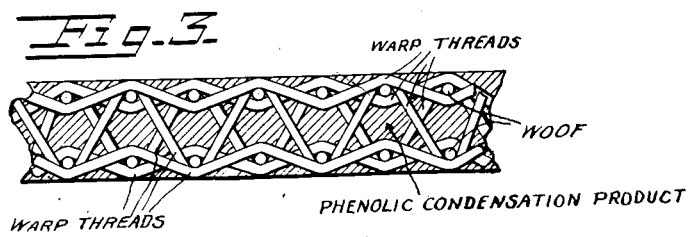

In the accompanying drawings which illustrate diagrammatically a material embodying my invention, Figure 1 is a plan view of the material; and Figs. 2 and 3 enlarged sectional views respectively taken on lines A—A and B—B of Fig. 1.

In carrying out or practising my method, a woven non-laminated body of the desired dimensions of sheet, plate or tubular form is produced by weaving suitable materials, as for example, cotton thread and woolen yarn, into the desired body, the weaving thereof extending in three directions instead of in two as in the usual cloth fabric. In the fabric which I employ, the warp threads extend side by side across the thickness of the sheet as well as across the width, that is, some of the warp threads are in a plane which is transverse to the others. Thus, the thickness is greater than the thickness of any two strands of fabric.

The material or materials of the character mentioned are, either prior to weaving or during the operation of weaving, saturated or impregnated with a liquid condensation product of phenols and formaldehyde, or their equivalents, of a character capable, under the action of heat, of being transformed into an insoluble and high heat resisting body. Or the woven body may be first produced and then saturated or impregnated with the liquid.

After the threads, yarn, etc., entering into the composite article have been saturated, impregnated or treated with the said liquid mixture, either prior to the operation of weaving or during weaving, the woven article may be dried or the excess liquid, if any, eliminated by the application of pressure with or without heat. Heat and pressure are both preferably applied to the article, thus producing a compact insoluble heat resisting or infusible body entirely free of laminations. In some instances, it may be desirable to subject the article to still further heat, that is to say, subject it to the gradually increasing heat of an oven.

The liquid mixture may be applied by passing the threads through a body of the liquid, or they may be subjected to a stream or spray of the liquid. As stated above, the materials entering into the woven body may be woven into the desired body prior to being subjected to the liquid condensation product of phenols and formaldehyde or their equivalents. If this last mentioned step is followed, the body may be saturated or impregnated with the liquid mixture by simply immersing the woven body in said liquid or immersing and applying pressure to the liquid to aid saturation, or by first subjecting the body to a vacuum, and then immersing with or without pressure.

After the saturation or impregnation, the composite non-laminated article is dried to some extent, or the excess liquid may be forced out by the application of pressure with or without heat.

In practice, I prefer to pass the article directly from the solution, and before it is dried, through pressure rolls, as this step will aid in eliminating air or gas pockets and any excess solution. After the drying step, heat is applied to the article, preferably with pressure, thereby transforming the article into a compact, insoluble and high heat resisting or infusible body.

In some instances it may be desirable to further treat the article by subjecting it to a gradually increasing heat of an oven or other container.

It will be understood that my invention includes non-laminated articles of cylindrical, tubular, and rod shapes, and the method of making the same, as well as articles and the method of making the same of sheet or plate form.

The non-laminated article or material made in accordance with my invention is particularly adaptable for use in the manufacture of gears and railway track insulation, although it may be utilized for many other purposes.

The thickness of the woven non-laminated article or material may, of course, be varied, but I am particularly interested in producing a material of the character described having a thickness equal to a laminated material in which the strands of fabric are of the same size as the strands in the non-laminated fabric, including several layers of superimposed pieces of cloth, paper, etc.

What I claim is:—

1. The method of making a non-laminated article of the character described, which consists in subjecting a suitable material to a liquid phenolic condensation product to saturate the material, and in weaving the material to produce an integral body of substantial thickness in which the weaving extends in three directions.

2. The method of making a composite non-laminated article including condensation products of phenols and formaldehyde, which consists in weaving strands of suitable material into a body of a thickness equal to a laminated body formed of a plurality of layers of woven material, with the layers thereof formed from the same size weaving strands as the said non-laminated body, and in subjecting the weaving material to the condensation products of phenols and formaldehyde.

3. A composite non-laminated article including a woven material of a thickness equal to a laminated article including a plurality of layers of material of the same size strands as the non-laminated article, and a condensation product of phenols and formaldehyde.

4. A composite non-laminated article composed of an integral fabric body in which the weaving extends in three directions to produce a substantial thickness to the fabric, said fabric being saturated with a hard plastic composition.

5. A composite non-laminated article composed of an integral fabric body in which the weaving extends in three directions to produce a substantial thickness to the fabric, said fabric being impregnated with a phenolic condensation product.

6. A composite non-laminated article composed of an integral fabric body having interwoven strands in which the thickness of the fabric is greater than the thickness of two superposed strands, whereby said fabric has a substantial thickness, said fabric being saturated with a phenolic condensation product.

7. A composite non-laminated article composed of a single integral woven fabric body having some of the warp threads thereof arranged in a plane transverse to the remaining warp threads whereby the body of the fabric has a substantial thickness, said fabric being saturated with a hardened phenolic condensation product.

8. A composite non-laminated article composed of a single integral woven fabric body having some of the warp threads thereof arranged in a plane transverse to the plane of the remaining warp threads, whereby the fabric has a substantial thickness, said fabric body being saturated with a condensation product of phenols and formaldehyde.

In testimony whereof I affix my signature in presence of two witnesses.

WILLIAM D. STEVENSON.

Witnesses:
J. M. GEOGHEGAN,
LOIS WINEMAN.